United States Patent [19]

Ni

[11] Patent Number: 5,575,933
[45] Date of Patent: Nov. 19, 1996

[54] FLEXIBLE ELONGATED WELDING ELECTRODE

[76] Inventor: Jian M. Ni, 75 Springbrook Drive, Richmond Hill, Ontario, Canada, L4B 3R3

[21] Appl. No.: 427,408

[22] Filed: Apr. 24, 1995

Related U.S. Application Data

[63] Continuation-in-part of Ser. No. 195,445, Feb. 7, 1994.
[51] Int. Cl.⁶ ................................................. B23K 35/10
[52] U.S. Cl. ................................. 219/145.31; 219/145.32
[58] Field of Search ........................... 219/145.41, 145.23, 219/145.31, 145.32

[56] References Cited

U.S. PATENT DOCUMENTS 2,016,899  10/1935  Humberstone .................. 219/145.41
2,019,970  11/1935  Hopkins ............................ 219/145.23
2,097,386  10/1937  Bock et al. ........................ 219/145.41
2,133,970  10/1938  Christensen et al. ............. 219/145.31
2,270,013   1/1942  Smith ................................ 219/145.41
2,818,496  12/1957  Ludwig ............................. 219/145.31
3,221,136  11/1965  Freeth et al. ..................... 219/145.32

Primary Examiner—Clifford C. Shaw
Attorney, Agent, or Firm—David W. Wong

[57] ABSTRACT

The elongated welding electrode has a flexible welding flux material coated on the outside surface of a flexible welding metal core. The flux material is provided in short equal length segments with slots formed between adjacent segments to expose the metal core therein. The welding current can be applied to the weld through the core in a plurality of the exposed slots so that a large current with relatively no current loss can be used in the welding operation. The slots also serve as means to facilitate the automatic advancement of the electrode through the welding equipment. The welding flux coating over the metal core of the electrode is covered with flexible protective coatings so that it is extremely flexible such that the flux coating will not break off from the metal core during winding on and unwinding from the carrier reel.

9 Claims, 3 Drawing Sheets

FLEXIBLE ELONGATED WELDING ELECTRODE

This application is a continuation-in-part application of U.S. patent application No. 08/195,445 by the same Applicant filed on Feb. 7, 1994 now abandoned.

BACKGROUND OF THE INVENTION

This invention relates to welding electrodes and particularly to an elongated flexible welding electrode suitable for continuous electric welding purposes.

Heretofore, welding electrodes for electric welding have been provided in short rods having a length of approximately 30 centimeters. The welding electrode or rod consists of a rigid metal core with flux material coated on its outside surface. In use the rod is mounted to a welding handle or gun which conducts a large current through the welding rod to form a weld on the metal welding surface. Such welding rods provides a generally high quality and good surface appearance weld. It can be used or adapted for welding to a large variety of metal surfaces and a relatively simple welding equipment is required. However, such short length welding electrodes are not suitable for continuous welding purposes since the welding process must be frequently disrupted in order to install new rods when each rod has been expended. Furthermore, there is a considerable wastage of the welding electrodes. This is due to that at least 2 centimeters of one end of the rod must be uncoated to provide the conducting surface for supplying the welding current to the rod. Since such end portion of the electrode is not provided with the welding flux material it can not be used for welding. Also, due to the welding technique employed, normally an additional 3 centimeters of the rod can not be used. Thus, for a common 30 centimeters welding rod, there is at least 5 centimeters of it is wasted, which amounts to a total of at least 15% of wastage of the electrode. Moreover, since the welding current is applied through the whole length of the rod which, due to the inherent current resistance of the metal rod, reduces the effective amount of current delivered to the tip of the rod for the welding operation. For the above reasons the efficiency of using welding rods for welding is low.

Another disadvantage of using welding rods, is that, for a large area to be welded, a plurality of weld areas would be formed since separate welding rods must be used during the welding operation; thus there are a plurality of joints among the non-integrally formed weld areas. These joints inherently reduce the strength of the weld.

Attempts have been made to produce elongated welding electrodes by providing the metal in a tubular form with the welding flux material contained within the welding tube. However, such tubular welding electrodes are difficult and expensive to fabricate.

Furthermore, heretofore, it has been unable to provide an elongated welding electrode which has such flexibility that any desired length of it may be wound on a reel for convenient storage purposes as well as for use in a continuous welding operation. This is due to that the welding flux materials are relatively brittle, so that it is not conducive for flexing. Any attempt to wind a welding electrode with a welding flux material coating provided thereon would result in the flux coating from breaking apart and separating from the metal core of the electrode.

SUMMARY OF THE INVENTION

It is a principal object of the present invention to provide an elongated flexible welding electrode which may be wound and unwound from a carrier reel.

It is another object of the present invention to provide an elongated welding electrode which facilitates maximum electric current to be used for welding.

It is another object of the present invention to provide an elongated welding electrode which is suitable for continuous welding operations.

It is another object of the present invention to provide an elongated flexible welding electrode having a unique flexible protective composite welding flux coating structure such that any desired length and may be conveniently wound in a storage or dispensing carrier reel without the danger of the flux coating from breaking apart and separating from the electrode.

It is yet another object of the present invention to provide an elongated welding electrode which can be produced with a continuous mass production process.

Briefly, the elongated welding electrode of the present invention comprises a continuous substantially flexible metal core having a substantially flexible welding flux material coating provided on its outer surface. A plurality of transverse slots are formed in an equally spaced distance over the entire length of the electrode. Furthermore, the welding flux coating is additionally protected by a flexible composite protective coating consisting of several layers of the welding flux material made into different forms and provided over the surface of the base flux coating.

DESCRIPTION OF THE DRAWINGS

Other objects and advantages of the present invention will become apparent from the following detailed description of the preferred embodiments thereof in connection with the accompanying drawings, in which.

DETAILED DESCRIPTION OF THE PREFERRED EMBODIMENTS

Figure 1:
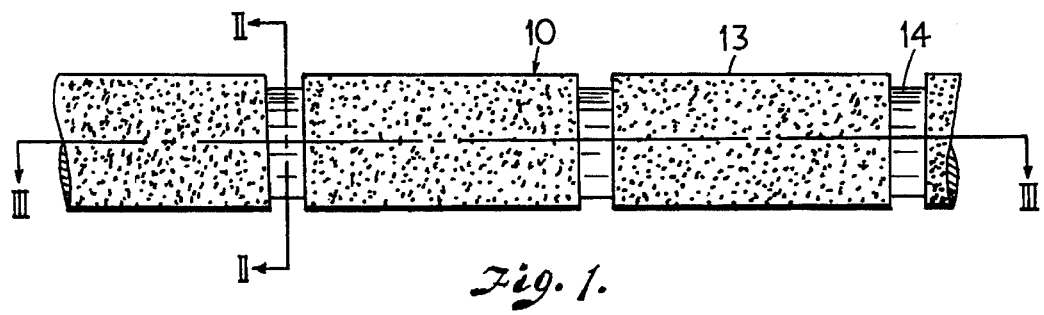
FIG. 1 is a perspective side elevation view of the elongated welding electrode according to the present invention.
Figure 2:
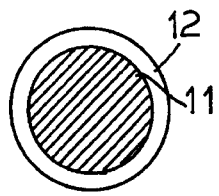
FIG. 2 is a section view thereof along cross section line II—II of FIG. 1.
Figure 3:
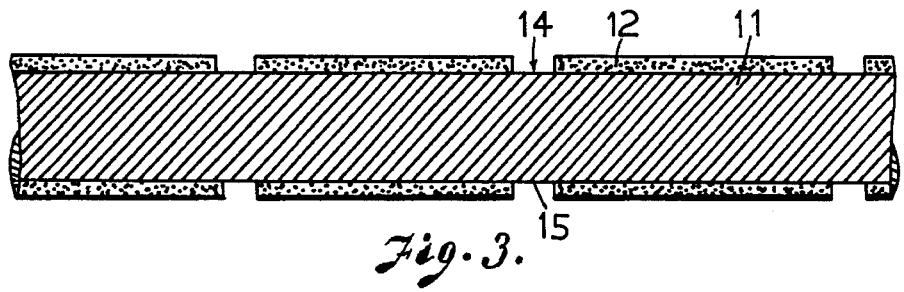
FIG. 3 is a section view thereof along the longitudinal section line III—III of FIG. 1.

With reference to the drawings wherein like reference numerals designate corresponding parts in the several views, the elongated welding electrode 10 comprises a continuous metal core 11 made of a selected metal alloy for welding purposes which is also substantially flexible such that it may be wound on a package reel. For example, copper or iron alloy may be used. The welding flux material 12 is coated on the outside surface of the core 11 in evenly spaced short segments 13, so that a circular slot 14 circumscribing the core 11 is formed between the adjacent segments 13. A circular portion 15 of the core 11 is exposed in the circular slot 14. For example, the segments 13 may have a length of about 50 millimeters and the circular slot 14 may have a width of about 2 millimeters. The flux material 12 may be provided with flexible aggregates such as sepiolite to enhance its flexibility so that the coated welding electrode 10 can be wound on a storage/dispensing reel.

Figure 4:
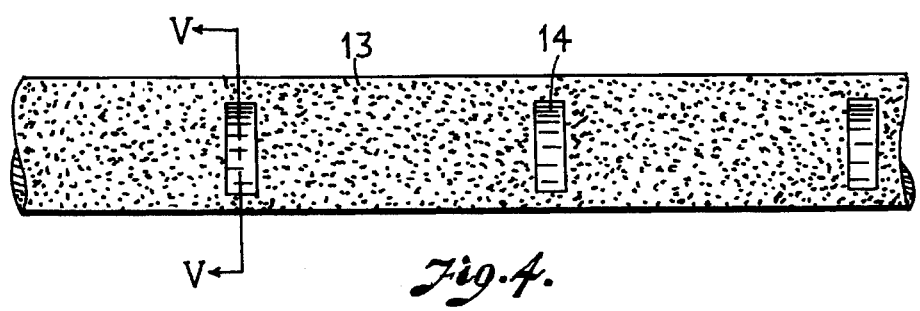
FIG. 4 is a perspective side elevation view of an alternative construction of the welding electrode according to the present invention.
Figure 5:
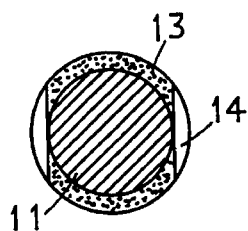
FIG. 5 is a section view of the welding electrode along cross section line V—V of FIG. 4.

The slots 14 may alternatively be short slots formed on at least one side of the flux material coating of the welding electrode 10 as best shown in FIGS. 4 and 5.

Figure 6:
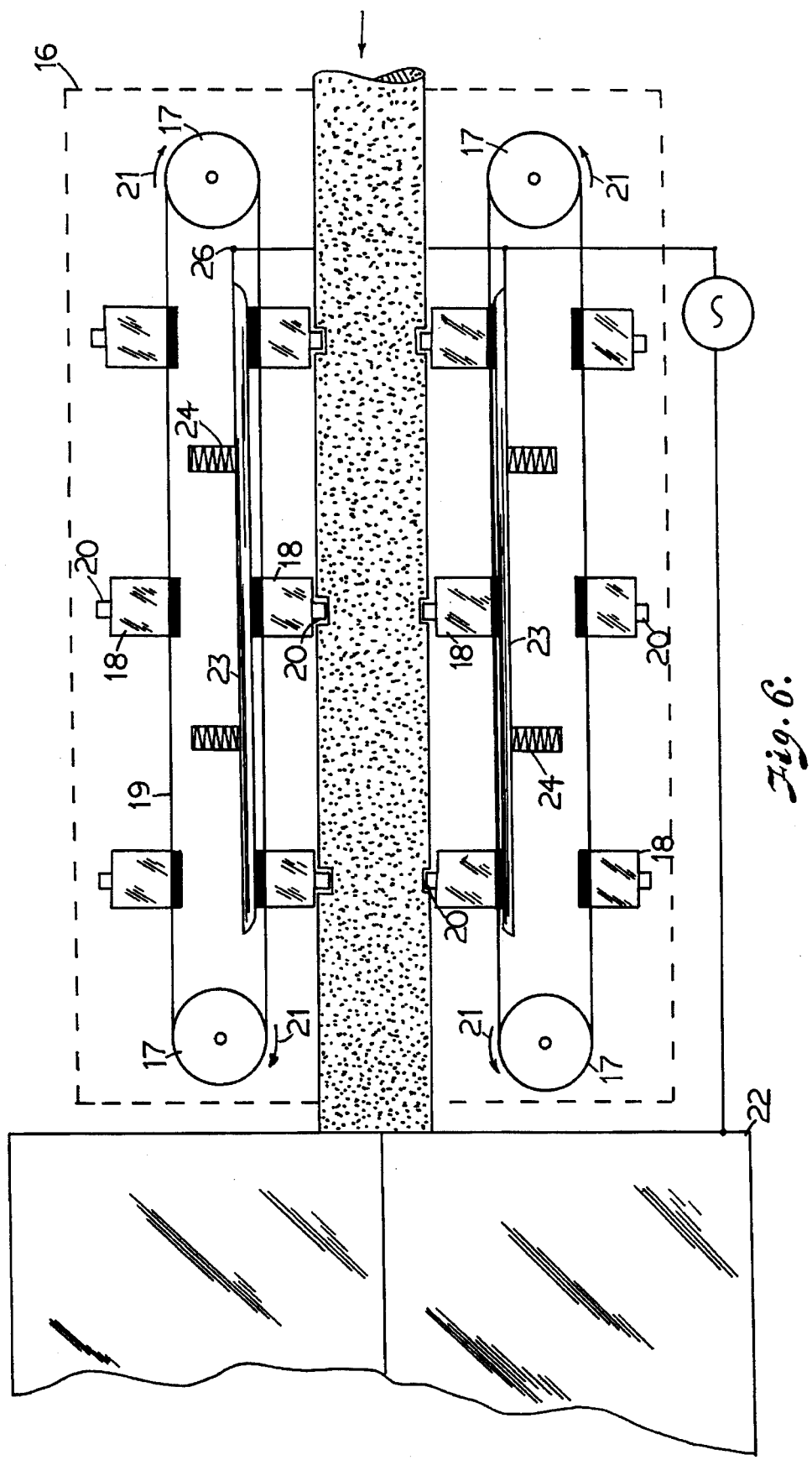
FIG. 6 is a partial schematic perspective view of the dispensing/welding device showing the use of the welding electrode for the welding operation.

In use, as best shown in the schematic diagram of FIG. 6, the welding electrode 10 can be fed through a welding device having a housing 16. The device has automatic drive wheels 17. A plurality of advancing elements 18 are mounted on the drive belt or chain 19 which are operatively driven by the drive wheels 17 when the latter are actuated. Each advancing element 18 has a metal contact extension 20. The advancing elements 18 are spaced at the same distance from the adjacent elements as the distance between the slots 14 on the welding electrode 10 so that the contact extensions 20 are engaging with the slots 14 in the welding electrode 10. When the drive wheels 17 are actuated they will rotate in the direction of the curved arrows 21 to move the advancing elements to dispense the welding electrode 10 out of the welding device towards the work pieces 22. Current contacting bars 23 are located in the welding device which contact the advancing elements 18 when the contact extensions 20 are in engagement with the slots 14 of the welding electrode 10. The current contacting bars 23 are urged by pressure springs 24 such that the metal current extensions 20 are pressed intimately on the exposed portion 15 of the metal core 11 in the welding electrode. The welding current from the current supply 25 is applied to the welding electrode 10 and the work piece 22 through electrical wiring 26 connected to the current contacting bars 23 and through electrical wiring 27 connected to the work piece 22. Since the welding current is applied to the welding electrode 10 at the first slot 14 which is only a short distance equal to the length of the first segment 13 of the welding flux coating there is virtually no current loss passing through the core 11 to the tip 18 of the electrode. Maximum current is further enhanced by the multiple contacts between the plurality of advancing elements 18 and the metal core 11 of the welding electrode 10 in all the engaged contact points between them. In this manner, the welding electrode 10 may be continuously fed to the work piece 22 to formed a weld having a high quality and strength. Furthermore, it is not necessary to disrupt the welding operation to install new welding rods. The welding electrode of the present invention therefore particularly lends itself to a robotic welding process in which the welding electrode can be continuously fed to the welding station. Any desired length of the electrode can be provided in a dispensing reel for use in a predetermined particular welding process.

Figure 7:
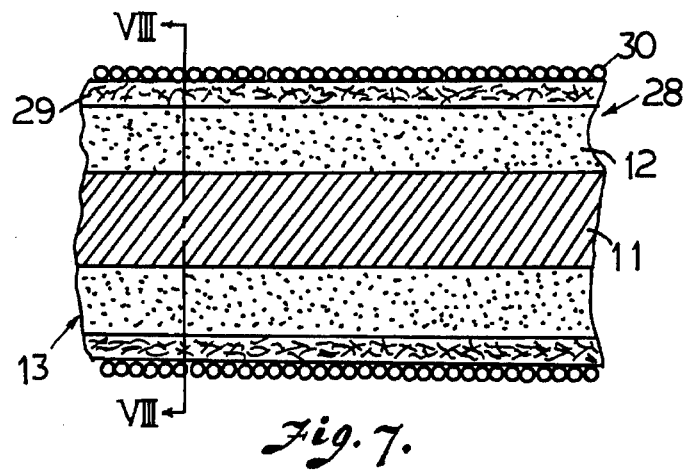
FIG. 7 is an isolated enlarged cross sectional perspective side elevation view of a short portion of the flexible welding electrode of FIG. 3 having a composite flexible protective outer coating provided over the base flux coating. The composite coating consists of a first inner layer of fibril material and an outer layer of a continuous web wound over the inner layer.
Figure 8:
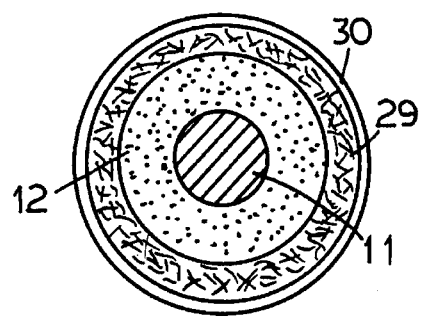
FIG. 8 is an enlarged cross sectional end elevation view of the flexible welding electrode along section line VIII—VIII of FIG. 7.

As shown in FIG. 7, a flexible outer protective composite. The outer layer 28 may be additionally provided over the base flux coating 12 of the above basic electrode. Theaeter composite layer 28 consists of at least two layers: an inner layer 29 and an outer layer 30 provided on the segments 13.

Figure 9:
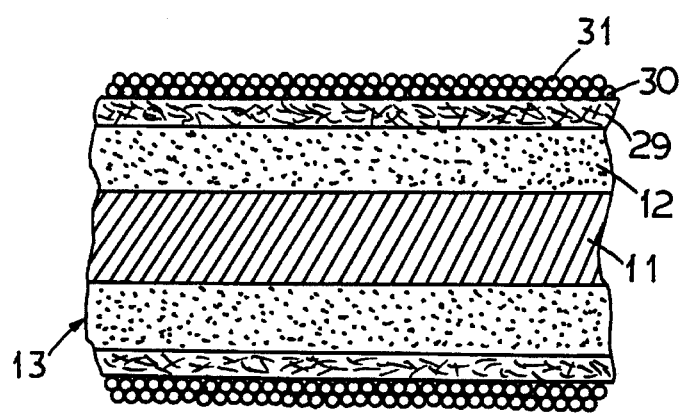
FIG. 9 is a cross sectional side elevation view of the flexible welding electrode having two outer layers in its composite coating.

The inner layer 29 is a mixture of fibrils made of the same material as the base flux coating 12 mixed with a flexible bonding substance such as epoxy. The inner layer 29 may have a thickness of from 0.3 millimeter to 1.0 millimeter. The outer layer 30 is an elongated glass-like web which is preferably also made of the same material as the base flux coating 12 together with a glass bonding substance and then is drawn in a continuous form of a web or thread. The web or thread is wound over the inner layer 29. The web or thread windings provides the additional binding to maintain the fibril inner layer 29 tightly in place over the base flux coating 12, and due to the flexibility of the inner layer 29 and outer layer 30 the electrode may be easily wound onto or unwound from a carrier reel without the danger of the welding flux coating of separating or breaking off from the metal core. Since the fibril and the web are made of the same material as the base flux coating, there is no contamination of the flux material to affect the result of the weld. The web may have a thickness of about 0.05 millimeter to 0.1 millimeter. An additional outermost second layer 31 of the web may be wound over the outer layer 30 as best shown in FIG. 9 to enhance the bonding of flexible welding flux material to the metal core. The outermost second layer 31 of web or thread windings preferably should be wound in the opposite direction as the first layer of web windings so that any stress in the electrode in bending during winding it onto or unwinding it from the carrier reel is distributed in two opposite directions to alleviate the stress.

Obviously, numerous modifications and variations of the present invention are possible in light of the above teachings. It is therefore to be understood that within the scope of the appended claims, the invention may be practised otherwise than as specifically described herein.

What is claimed is:

1. A flexible elongated welding electrode comprising, an elongated continuous flexible metal alloy core having outer surface therein coated with a composite flexible welding flux material coating impregnated with a flexible aggregate material and a bonding carrier material, a plurality of transverse slots formed along directly opposite sides of said coating and exposing a narrow portion of said core in said slots, and said slots having side walls perpendicular to said core and being formed at evenly spaced distance along the entire length of said electrode and having an equal width.

2. A flexible elongated welding electrode comprising, an elongated continuous flexible metal alloy core having an outer surface therein coated with a base layer flexible welding flux material impregnated with a flexible aggregate material, a plurality of equal length flux sections formed on said base layer flexible welding flux material, a plurality of equal width transverse slots formed between adjacent flux sections, said slots having side walls substantially perpendicular to said core and exposing a portion of said core, a flexible composite flux material layer formed on said flux sections.

3. A flexible elongated welding electrode according to claim 2 wherein said composite flux material layer comprises at least a single fibril mixture layer of a flux material made in fibrils and mixed with a flexible carrier medium material.

4. A flexible elongated welding electrode according to claim 3 wherein said fibrils are made from the same flux material as said base layer flexible welding flux material.

5. A flexible elongated welding electrode according to claim 4 wherein said composite flux material layer includes an outer layer comprising a flux material made in a web form and wound over said fibril layer.

6. A flexible elongated welding electrode according to claim 5 wherein said web is made from the same flux material as said base layer flexible welding flux material.

7. A flexible elongated welding electrode according to claim 6 wherein said web is a continuous thread made of the same flux material as said base layer flexible welding flux material mixed with a glass-like medium.

8. A flexible elongated welding electrode according to claim 7 wherein said composite flux material layer includes an outermost layer provided over said outer layer, said outermost layer comprising a web same as said outer layer.

9. A flexible elongated welding electrode according to claim 8 wherein said web of said outer layer and said web of said outermost layer are wound in the mutually opposite directions.

* * * * *